(12) United States Patent
Pan et al.

(10) Patent No.: US 11,098,635 B2
(45) Date of Patent: Aug. 24, 2021

(54) MUFFLER BRACE ASSEMBLY

(71) Applicant: Nissan North America, Inc., Franklin, TN (US)

(72) Inventors: Ren Pan, Novi, MI (US); Amarendra Kumar, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 16/263,785

(22) Filed: Jan. 31, 2019

(65) Prior Publication Data

US 2020/0248611 A1 Aug. 6, 2020

(51) Int. Cl.
| F16L 3/00 | (2006.01) |
| F01N 13/18 | (2010.01) |
| F16L 3/14 | (2006.01) |

(52) U.S. Cl.
CPC ............ *F01N 13/1805* (2013.01); *F16L 3/14* (2013.01)

(58) Field of Classification Search
CPC ............ F01N 13/1822; F01N 13/1805; F01N 13/1838; F01N 13/1844; F01N 13/1855; B60K 13/04
USPC ......... 248/634, 638; 180/89.2, 296; 280/309
See application file for complete search history.

(56) References Cited

U.S. PATENT DOCUMENTS

| 2,568,409 | A | | 9/1951 | Phillips | |
| 4,148,211 | A | | 4/1979 | Sawa et al. | |
| 6,298,935 | B1 | * | 10/2001 | Steenackers | B60K 13/04 180/296 |
| 7,246,680 | B2 | * | 7/2007 | Osterkamp | F01N 1/02 180/296 |
| 8,550,204 | B2 | * | 10/2013 | Takagi | F01N 13/08 180/296 |
| 2010/0006369 | A1 | * | 1/2010 | Sugiyama | F01N 13/20 181/228 |
| 2012/0312954 | A1 | * | 12/2012 | Rodecker | F01N 13/1822 248/617 |

FOREIGN PATENT DOCUMENTS

| CN | 201560830 U | 8/2010 |
| JP | 2008-303756 A | 12/2008 |
| KR | 2003-0055381 A | 7/2003 |

OTHER PUBLICATIONS

Photograph of vehicle exhaust system, at least as early as Jan. 11, 2019.

\* cited by examiner

*Primary Examiner* — Steven M Marsh
(74) *Attorney, Agent, or Firm* — Global IP Counselors, LLP

(57) ABSTRACT

A muffler brace assembly for a vehicle includes a muffler and a pipe connected to an inlet of the muffler. A brace member has a first end and a second end. The first end of is connected to the pipe and the second end is connected to the muffler. A lowermost portion of the brace member is disposed lower than lowermost portions of the pipe and the muffler.

20 Claims, 5 Drawing Sheets

MUFFLER BRACE ASSEMBLY

BACKGROUND

Field of the Invention

The present invention generally relates to a muffler brace assembly configured to substantially prevent damage to a vehicle exhaust system. More specifically, the present invention relates to a brace member connected to a muffler inlet pipe and to a muffler in which the brace member is disposed lower than lowermost portions of the muffler inlet pipe and the muffler.

Background Information

Portions of a vehicle exhaust system, such as a muffler or an inlet pipe to the muffler, are mounted at a height at which these components are susceptible to contacting an obstruction, such as a parking curb or block, particularly when driving a vehicle in reverse. A driver of the vehicle cannot see whether the obstruction will contact an exhaust system component as the vehicle is backing up. The driver does not realize an exhaust system component has contacted an obstruction until hearing a noise as the obstruction contacts the exhaust system component. When a muffler inlet pipe contacts a parking curb as the vehicle is backing up, for example, the force of the contact drives the muffler inlet pipe and portions of the vehicle exhaust system to which the muffler inlet pipe is connected forward, thereby damaging portions of the exhaust system in addition to the component struck by the parking curb. Repairing and/or replacing the damaged components of the vehicle exhaust system can be expensive. Accordingly, a need exists for a muffler brace assembly configured to substantially prevent damage to a vehicle exhaust system.

SUMMARY

An object of the disclosure is to provide a muffler brace assembly configured to substantially prevent damage to a vehicle exhaust system.

In view of the state of the known technology, one aspect of the present disclosure is to provide a muffler brace assembly including a muffler and a pipe connected to an inlet of the muffler. A brace member has a first end and a second end. The first end of is connected to the pipe and the second end is connected to the muffler. A lowermost portion of the brace member is disposed lower than lowermost portions of the pipe and the muffler.

Another aspect of the present invention includes a muffler brace assembly for a vehicle includes a first muffler and a second muffler. A first pipe extends from a first inlet of the first muffler to a first coupling joint. A second pipe extends from a second inlet of the second muffler to a second coupling joint. A first brace member has a first end and a second end. The first end is connected to the first pipe and the second end is connected to the first muffler. A lowermost portion of the first brace member is disposed lower than lowermost portions of the first pipe and the first muffler. A second brace member has a third end and a fourth end. The third end is connected to the second pipe and the fourth end is connected to the second muffler. A lowermost portion of the second brace member is disposed lower than lowermost portions of the second pipe and the second muffler. The first and second coupling joints are disposed between the first and second brace members when viewed in a longitudinal direction of a vehicle.

Also other objects, features, aspects and advantages of the disclosed muffler brace assembly will become apparent to those skilled in the art from the following detailed description, which, taken in conjunction with the annexed drawings, discloses exemplary embodiments of the muffler brace assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
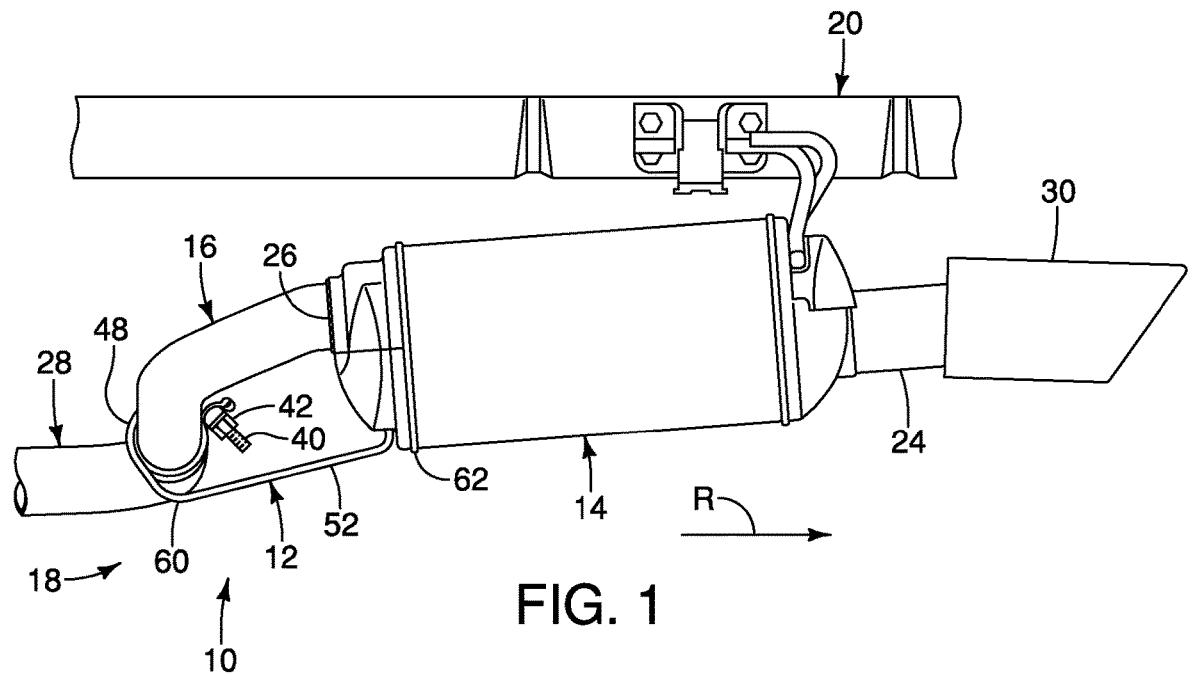
FIG. 1 is a perspective view of a muffler brace assembly for an exhaust system of a vehicle in accordance with an exemplary embodiment of the present invention.
Figure 2:
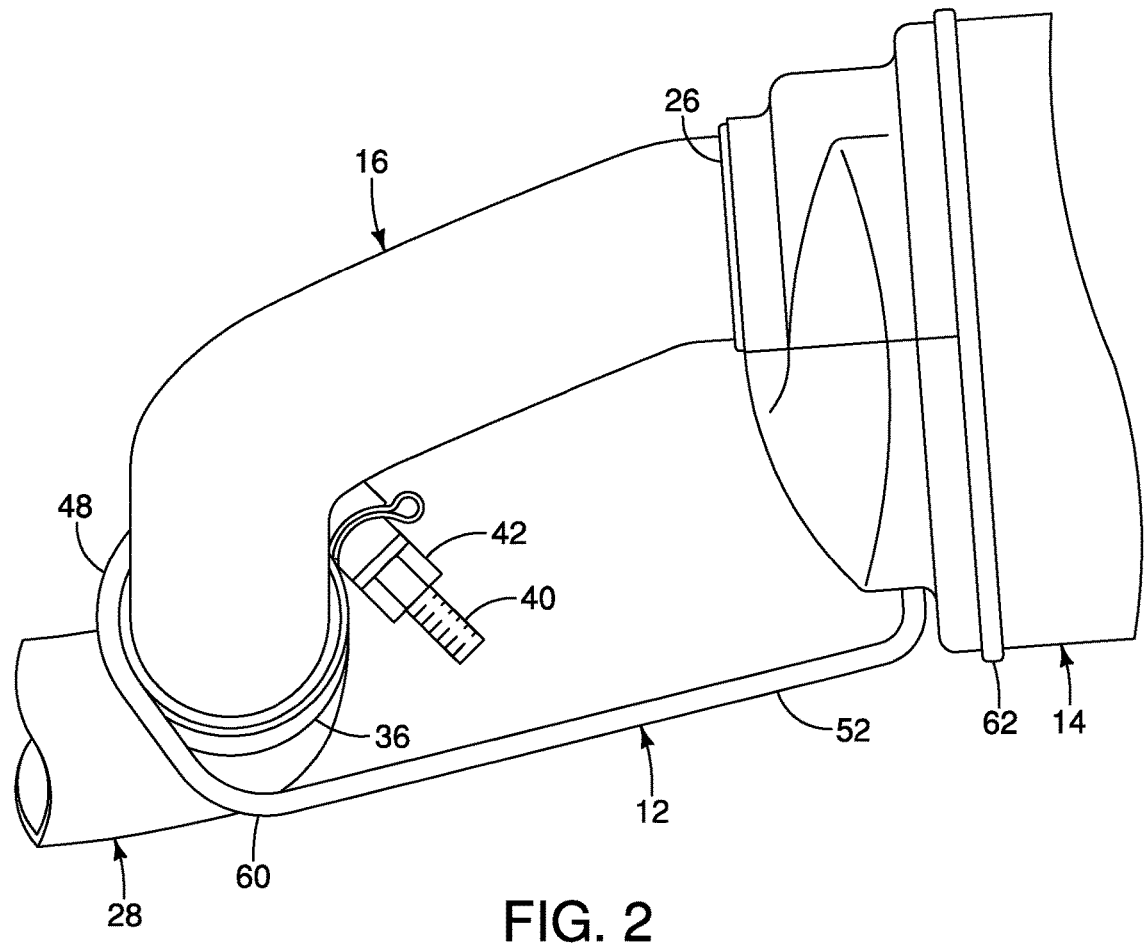
FIG. 2 is an enlarged perspective view of the muffler brace assembly of FIG. 1.
Figure 3:
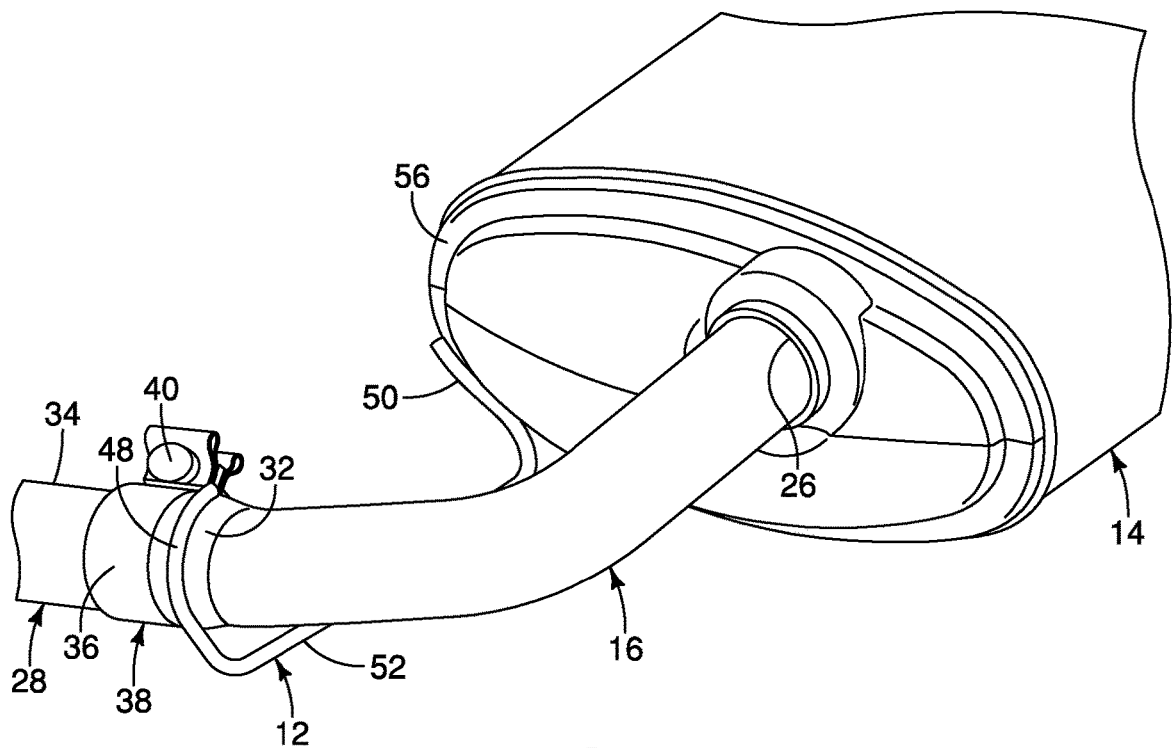
FIG. 3 is a perspective view of the muffler brace assembly of FIG. 1 connected to a muffler and a muffler inlet pipe.
Figure 4:
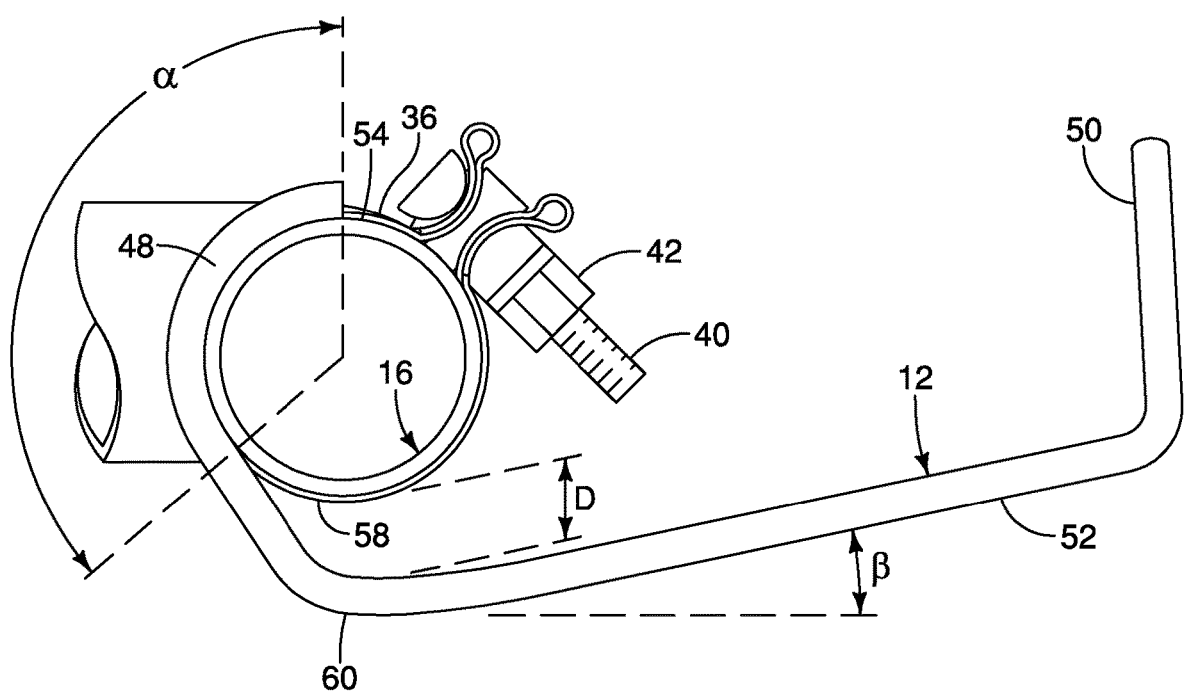
FIG. 4 is a side elevational view in partial cross section of the muffler brace assembly of FIG. 1.
Figure 5:
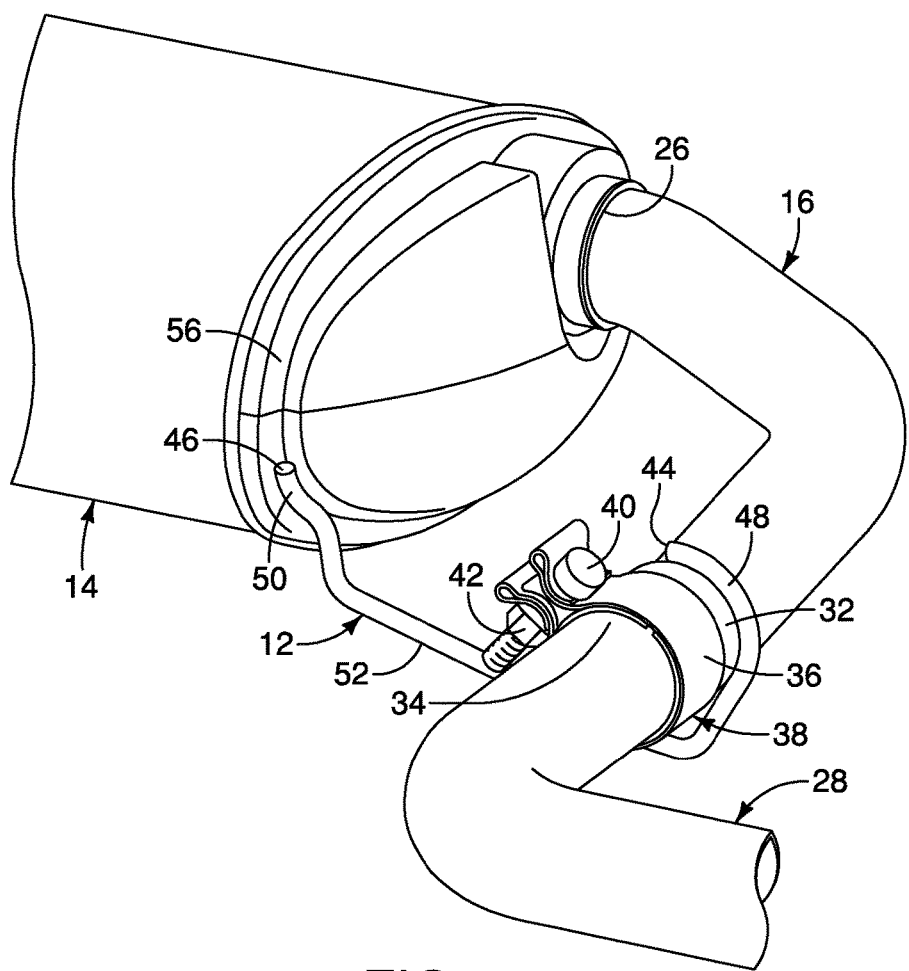
FIG. 5 is a perspective view of the muffler brace assembly of FIG. 1 illustrating the welding portions of the brace member.
Figure 6:
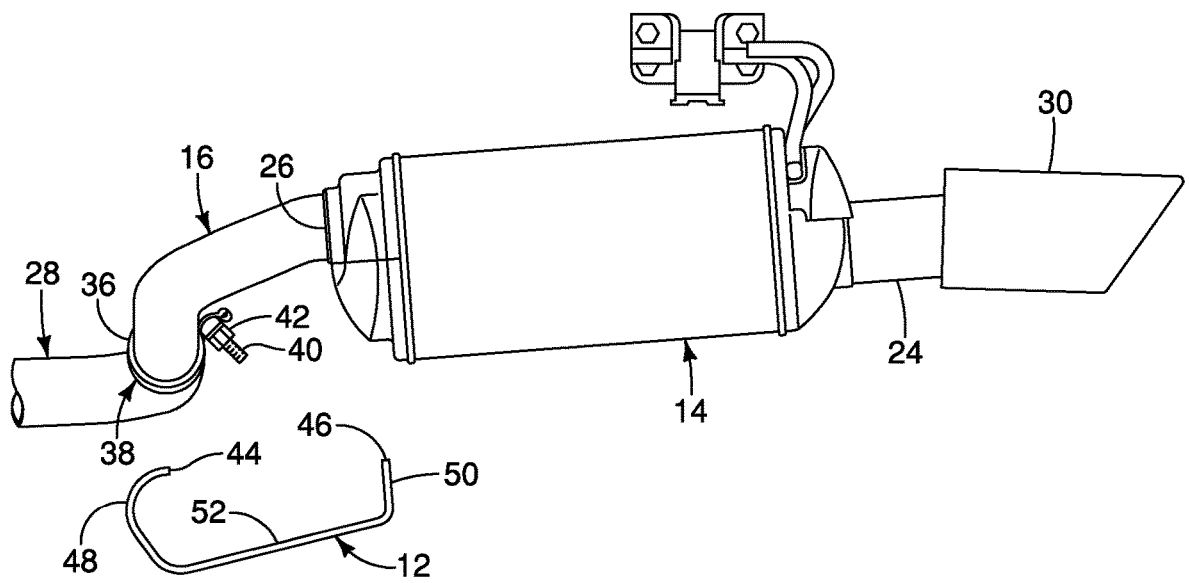
FIG. 6 is an exploded assembly view of the muffler brace assembly of FIG. 1.
Figure 7:
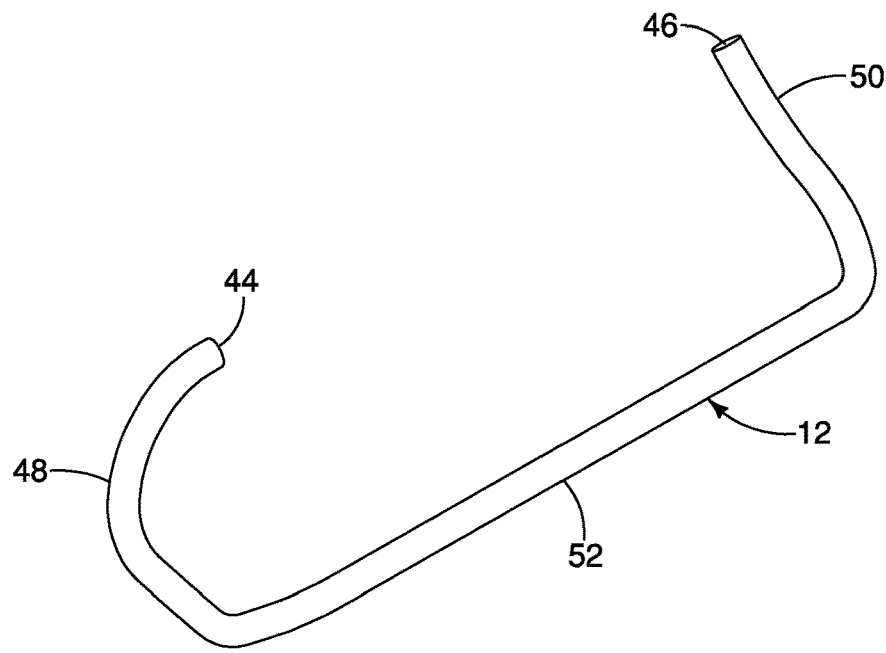
FIG. 7 is a side elevational view of the brace member of FIG. 1.
Figure 8:
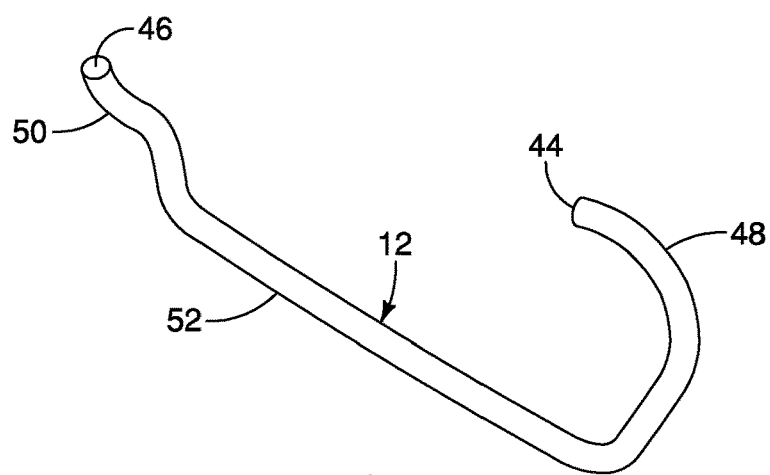
FIG. 8 is an opposite side elevational view of the brace member of FIG. 7.
Figure 9:
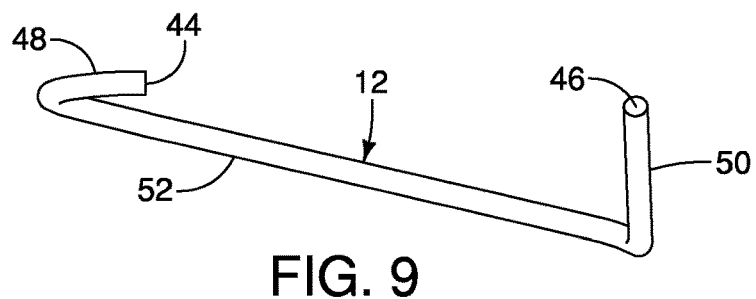
FIG. 9 is a top plan view of the brace member of FIG. 7.

Referring initially to FIGS. 1-6, a muffler brace assembly 10 is illustrated in accordance with an exemplary embodiment of the present invention. The muffler brace assembly 10 includes a brace member 12 connected to a muffler 14 and to an inlet pipe 16 of the muffler 14, as shown in FIGS. 1, 3 and 5. A lowermost portion of the brace member 12 is lower than lowermost portions of the inlet pipe 16 and the muffler 14, as shown in FIGS. 1 and 2, thereby substantially preventing accidentally damaging the vehicle exhaust system 18 when backing up a vehicle 20.

The vehicle exhaust system 18, as shown in FIG. 1, carries exhaust gases away from an engine 222 (FIG. 11) and discharges the exhaust gases from the vehicle 20 through a tailpipe 24. Between the engine 222 (FIG. 11) and the tailpipe 24, the exhaust gases pass through the muffler 14. A muffler inlet pipe 16 is connected to an inlet 26 of the muffler 14 and to a pipe 28 of the exhaust system 18 to supply the exhaust gases to the muffler 14. An exhaust tip 30 can be connected to the tailpipe 24 to provide an aesthetic appearance.

The muffler inlet pipe 16 has a socket end 32 that receives a spigot end 34 of the exhaust system pipe 28, as shown in FIGS. 3 and 5. A clamp 36 can be used to further secure the muffler inlet pipe 16 and the exhaust system pipe 28 together, thereby defining a coupling joint 38 between the muffler inlet pipe 16 and the exhaust system pipe 28. The clamp 36 extends around a circumference of the socket end 32 of the muffler inlet pipe 16. A fastener 40 and nut 42 tighten the free ends of the clamp 36 together to further secure the connection between the exhaust system pipe 28 and the muffler inlet pipe 16. The coupling joint 38 is disposed on an upstream side of the muffler 14, such that the muffler inlet pipe 16 extends from the coupling joint 38 to the muffler inlet 26.

The brace member 12 has a first end 44 and a second end 46, as shown in FIGS. 6-9. A first welding portion 48 of the brace member 12 is configured to be connected to the muffler inlet pipe 16. A second welding portion 50 of the brace member 12 is configured to be connected to the muffler 14. A connecting portion 52 of the brace member 12 connects the first welding portion 48 and the second welding portion 50. The first welding portion 48 of the brace member 12 extends from the first end 44 of the brace member 12 toward the connecting portion 52. The second welding portion 50 of the brace member 12 extends from the second end 46 of the brace member 12 toward the connecting portion 52. The connecting portion 52 of the brace member 12 between the muffler inlet pipe 16 and the muffler 14 is substantially linear when viewed in a widthwise direction of the vehicle, as shown in FIGS. 1, 2, 4 and 6-9. Although the connecting portion 52 is shown as being substantially linear in FIGS. 1, 2, 4 and 6-9, the connecting portion 52 can have any suitable shape. As shown in FIGS. 1 and 2, the brace member 12 extends in a substantially longitudinal direction of the vehicle between the muffler inlet pipe 16 and the muffler 14. The brace member 12 is preferably made of stainless steel, although any suitable material can be used.

As shown in FIGS. 6-9, the first welding portion 48 provides a portion of the brace member 12 configured to be connected to the muffler inlet pipe 16 and the second welding portion 50 provides a portion of the brace member 12 configured to be connected to the muffler 14. As shown in FIG. 5, the first end 44 of the brace member 12 is connected to the muffler inlet pipe 16 and the second end 46 is connected to the muffler 14. The first welding portion 48 is disposed in a first plane (through the weld between the brace member 12 and the muffler inlet pipe 16) and the second welding portion 50 is disposed in a second plane (through the weld between the brace member 12 and the muffler 14) that is different from the first plane.

The first welding portion 48 of the brace member 12 is welded to the muffler inlet pipe 16, as shown in FIGS. 1-5. The first welding portion 48 is welded along a circumference of the muffler inlet pipe 16. An angular welding area a is defined by the angular amount welded between the brace member 12 and the muffler inlet pipe 16 around the circumference of the muffler inlet pipe 16. Preferably, the angular welding area a is at least approximately 60 degrees, as shown in FIG. 4. More preferably, the angular welding area a is approximately 120 degrees. The first welding portion 48 is welded to an uppermost surface 54 of the muffler inlet pipe 16, and the angular welding area a extends in a counter-clockwise direction therefrom. As shown in FIGS. 1 and 2, the muffler inlet pipe 16 is disposed between the first welding portion 48 of the brace member 12 and the muffler 14 when viewed in a widthwise direction of the vehicle. The first welding portion 48 can be welded to the socket end 32 of the muffler inlet pipe 16, as shown in FIG. 3, or to any suitable portion of the muffler inlet pipe 16.

The second welding portion 50 of the brace member 12 is welded to the muffler 14, as shown in FIG. 3. As shown in FIGS. 3 and 5, the second welding portion 50 is welded to a front face 56 of the muffler 14. The second welding portion 50 is preferably curved to correspond to the curvature of the front face 56 of the muffler 14 to facilitate welding the second welding portion 50 to the front face 56 of the muffler 14. The first welding portion 48 is disposed in a first plane and the second welding portion 50 is disposed in a second plane that is different from the first plane.

As shown in FIG. 4, a gap D is defined between the muffler inlet pipe 16 and the brace member 12, thereby spacing the muffler inlet pipe 16 from the brace member 12. More specifically, the gap D is defined between the lowermost portion 58 of the muffler inlet pipe 16 and an upper surface of the brace member 12. The gap D is facilitated by providing the connecting portion 52 of the brace member 12 between the muffler inlet pipe 16 and the muffler 14 at an angle β relative to the ground when viewed in a widthwise direction of the vehicle. The angle β can be any suitable angle, such as approximately twenty degrees, that provides spacing between the lowermost portion 58 of the muffler inlet pipe 15 and the upper surface of the brace member 12.

As shown in FIGS. 1-5, a lowermost portion 60 of the brace member 12 is disposed lower than a lowermost portion 58 of the muffler inlet pipe 16 and a lowermost portion 62 of the muffler 14. The lowermost portion 60 of the brace member 12 is disposed closer to the muffler inlet pipe 16 than to the muffler 14 when viewed in a widthwise direction of the vehicle. When viewed in a widthwise direction of the vehicle, as shown in FIGS. 1, 2 and 4, the lowermost portion 60 of the brace member 12 is lower than lowermost portions 58 and 62 of the muffler inlet pipe 16 and the muffler 14, respectively, such that the brace member 12 will contact an obstruction, such as a parking curb, before components of the vehicle exhaust system 18, particularly components disposed upstream of the muffler 14, such as the exhaust system pipe 28. When the vehicle is traveling in the reverse direction, indicated by the arrow R in FIG. 1, the brace member 12 will contact the obstruction before components of the vehicle exhaust system 18 because the lowermost portion 60 the brace member 12 is disposed lower than lowermost portions 58 and 62 of the muffler inlet pipe 16 and the muffler 14, respectively. When the brace member 12 contacts an obstruction, a noise is generated, thereby warning a driver of contact with an obstruction.

The spacing D between the muffler inlet pipe 16 and the brace member 12 substantially prevents transferring an impact force directly to the muffler inlet pipe 16, as shown in FIG. 4. By providing the welding area a around the circumference of the muffler inlet pipe 16, the muffler inlet pipe 16 is caused to deflect in an upward direction when the brace member 12 contacts an obstruction. The upward deflection of the muffler inlet pipe 16 substantially prevents damaging any component of the vehicle exhaust system 18 due to contact with an obstruction. In the absence of the brace member 12, an impact force due to contacting an obstruction drives the contacted component of the vehicle exhaust system in the forward direction, thereby damaging additional components of the vehicle exhaust system due to the rigidity with which the vehicle exhaust system is mounted in the longitudinal direction of the vehicle.

Second Exemplary Embodiment

Figure 10:
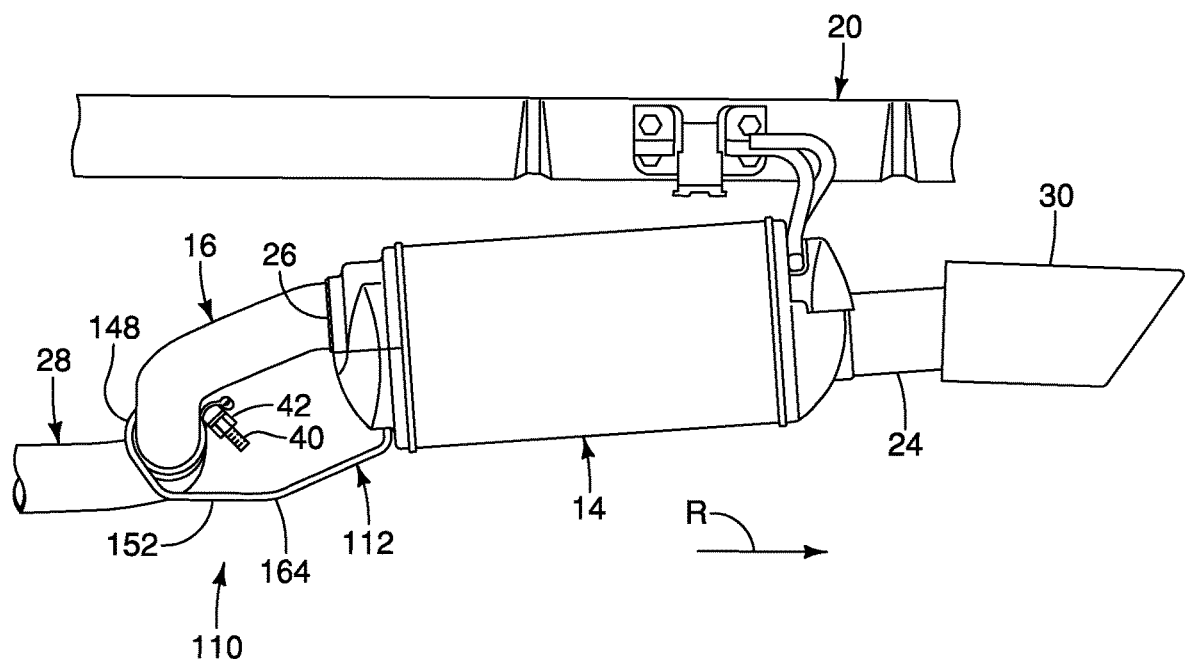
FIG. 10 is a perspective view of a muffler brace assembly in accordance with another exemplary embodiment of the present invention.

As shown in FIG. 10, a muffler brace assembly 110 in accordance with another illustrated exemplary embodiment of the present invention is substantially similar to the muffler brace assembly 10 of the exemplary embodiment illustrated in FIGS. 1 to 9 except for the differences described below. Similar parts are identified with similar reference numerals, except increased by 100 (i.e., 1xx, accordingly).

Referring to FIG. 10, the muffler brace assembly 110 is substantially identical to the muffler brace assembly 10 of the first exemplary embodiment except for the configuration of the muffler brace 112. A lowermost portion of the muffler brace 112 is disposed between the muffler inlet pipe 16 and the muffler 10. The muffler brace 112 has an angled portion 164 disposed between the muffler inlet pipe 16 and the muffler 14 when viewed in a widthwise direction of the vehicle. The angled portion 164 is the lowermost portion of the brace member 112. The angled portion 164 is disposed in the connecting portion 152 of the brace member 112 between the first welding portion 148 and the second welding portion (50 in FIG. 4). The angled portion 164 is angled toward the ground. The angled portion 164 of the brace member 112 is disposed closer to the muffler inlet pipe 16 than to the muffler 14 when viewed in a widthwise direction of the vehicle. The angled portion 164

The angled portion 164 of the brace member 112 is disposed rearwardly, as indicated by the arrow R, of the muffler inlet pipe 16. By disposing the angled portion 164 rearwardly of the muffler inlet pipe 16, the angled portion 164 will contact an obstruction when the vehicle is traveling in the reverse direction, which is also indicated by the arrow R in FIG. 10, before when the lowermost portion 60 of the brace member 12 is disposed more forward as in FIGS. 1-9. The angled portion 164 being disposed more rearwardly provides an earlier warning to a driver regarding contact with an obstruction, such as a parking curb. The further rearward the angled portion 164 is disposed relative to the muffler inlet pipe 16, the sooner an audible indication is generated warning the driver of contact with an obstruction. Otherwise, the brace member 112 of FIG. 10 operates similarly to the brace member 12 of FIGS. 1-9 to provide similar advantages and benefits.

Other Exemplary Embodiments

Figure 11:
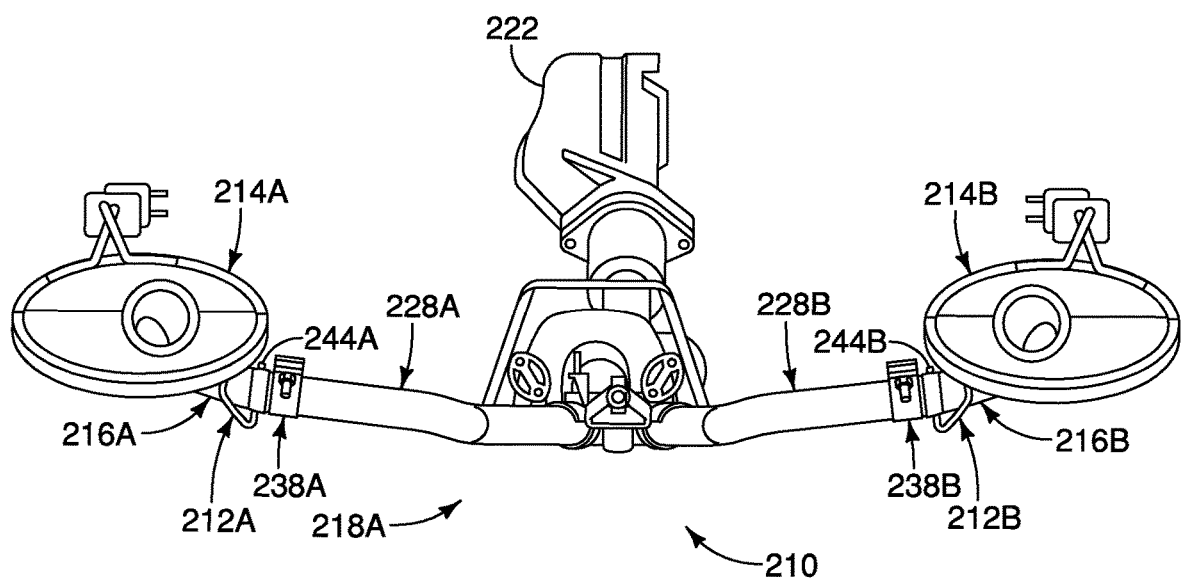
FIG. 11 is a perspective view of the muffler brace assembly of FIG. 1 including first and second brace members.

As shown in FIG. 11, a muffler brace assembly in accordance with another illustrated exemplary embodiment of the present invention is substantially similar to the muffler brace assembly 10 of the exemplary embodiment illustrated in FIGS. 1 to 9 except for the differences described below. Similar parts are identified with similar reference numerals.

As shown in FIGS. 1-6, a muffler brace assembly 10 is illustrated including a muffler 14. However, the muffler brace assembly is equally applicable to a vehicle exhaust system having first and second mufflers 214A and 214B, as shown in FIG. 11. The muffler brace assembly 210 is substantially similar to the muffler brace assembly 10, except that each of the first and second mufflers 214A and 214B has a brace member 212A and 212B, respectively. The first and second brace members 212A and 212B can be configured similarly to the brace member 12 of FIG. 1-9 or to the brace member 112 of FIG. 10.

A vehicle exhaust system 218 illustrated in FIG. 11, passes exhaust gases from the engine 222 through first and second mufflers 214A and 214B. Each of first and second muffler inlet pipes 216A and 216B is connected to an inlet of the first and second mufflers 214A and 214B and to a pipe 228A and 228B, respectively, of the exhaust system 218.

The muffler brace assembly 212 illustrated in FIG. 11 includes a first muffler inlet pipe 216A extending from a first inlet of the first muffler 214A to a first coupling joint 238A, and a second pipe 216B extending from a second inlet of the second muffler 214B to a second coupling joint 238B.

A first end 244A of the first brace member 212A is connected to the first muffler inlet pipe 216A and a second end is connected to the first muffler 214A. A lowermost portion of the first brace member 212A is disposed lower than lowermost portions of the first muffler inlet pipe 216A and the first muffler 214.

A third end 244B of the second brace member 212B is connected to the second muffler inlet pipe 216B and a fourth end is connected to the second muffler 214B. A lowermost portion of the second brace member 212B is disposed lower than lowermost portions of the second muffler inlet pipe 216B and the second muffler 214B.

The first and second coupling joints 238A and 238B are disposed between the first and second brace members 212A and 212B when viewed in a longitudinal direction of a vehicle, as shown in FIG. 11.

Otherwise, the first and second brace members 212A and 212B of FIG. 11 are configured similarly to the brace member 12 of FIGS. 1-9 or to the brace member 112 of FIG. 10 to provide similar advantages and benefits.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the wheel balancing tool. Accordingly, these terms, as utilized to describe the present invention should be interpreted relative to the wheel balancing tool.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A muffler brace assembly for a vehicle comprising:
a muffler;
a pipe connected to an inlet of the muffler; and
a brace member having a first end and a second end, the first end being connected to the pipe and the second end being directly connected to the muffler, a lowermost portion of the brace member being disposed lower than lowermost portions of the pipe and the muffler,
the second end of the brace member being spaced from the inlet of the muffler in a widthwise direction of the vehicle to substantially prevent transferring a force imparted to the brace member to the inlet of the muffler.

2. The muffler brace assembly according to claim 1, wherein
the pipe extends from a coupling joint upstream of the muffler to the muffler inlet.

3. The muffler brace assembly according to claim 1, wherein
the brace member includes a first welded portion welded to the pipe.

4. The muffler brace assembly according to claim 3, wherein
the brace member includes a second welded portion welded to the muffler.

5. The muffler brace assembly according to claim 3, wherein
the first welded portion is welded to an uppermost surface of the pipe.

6. The muffler brace assembly according to claim 3, wherein
the first welded portion extends at least sixty degrees on a circumference of the pipe.

7. The muffler brace assembly according to claim 3, wherein
a connecting portion of the brace member between the pipe and the muffler extends at an angle relative to the ground when viewed in a widthwise direction of a vehicle.

8. The muffler brace assembly according to claim 1, wherein
a lowermost portion of the pipe is spaced from the brace member.

9. The muffler brace assembly according to claim 1, wherein
the lowermost portion of the brace member is disposed closer to the pipe than to the muffler when viewed in a widthwise direction of the vehicle.

10. The muffler brace assembly according to claim 1, wherein
a connecting portion of the brace member between the pipe and the muffler is substantially linear when viewed in a widthwise direction of a vehicle.

11. The muffler brace assembly according to claim 1, wherein
the brace member has a curved portion disposed between the pipe and the muffler when viewed in a widthwise direction of a vehicle.

12. The muffler brace assembly according to claim 11, wherein
the curved portion is curved toward the ground.

13. The muffler brace assembly according to claim 11, wherein
the curved portion is disposed closer to the pipe than to the muffler when viewed in a widthwise direction of the vehicle.

14. The muffler brace assembly according to claim 11, wherein
the curved portion is the lowermost portion of the brace member.

15. The muffler brace assembly according to claim 1, wherein
the first welded portion is disposed in a first plane, and the second welded portion is disposed in a second plane, the second plane being different from the first plane.

16. The muffler brace assembly according to claim 3, wherein
the pipe is disposed between the first welded portion and the muffler when viewed in a widthwise direction of a vehicle.

17. The muffler brace assembly according to claim 1, wherein
the brace member is made of stainless steel.

18. A muffler brace assembly for a vehicle comprising:
a first muffler;
a second muffler;
a first pipe extending from a first inlet of the first muffler to a first coupling joint;
a second pipe extending from a second inlet of the second muffler to a second coupling joint;
a first brace member having a first end and a second end, the first end being connected to the first pipe and the second end being connected to the first muffler, a lowermost portion of the first brace member being disposed lower than lowermost portions of the first pipe and the first muffler; and
a second brace member having a third end and a fourth end, the third end being connected to the second pipe and the fourth end being connected to the second muffler, a lowermost portion of the second brace member being disposed lower than lowermost portions of the second pipe and the second muffler,
the first and second coupling joints being disposed between the first and second brace members when viewed in a longitudinal direction of a vehicle.

19. The muffler brace assembly according to claim 18, wherein
the first brace member includes a first welded portion welded to the first pipe, the first welded portion extending at least sixty degrees on a circumference of the first pipe; and
the second brace member includes a second welded portion welded to the second pipe, the second welded portion extending at least sixty degrees on a circumference of the second pipe.

20. The muffler brace assembly according to claim 18, wherein
a lowermost portion of the first pipe is spaced from the first brace member; and
a lowermost portion of the second pipe is spaced from the second brace member.

* * * * *